US012576639B2

(12) United States Patent
Shimosato

(10) Patent No.: US 12,576,639 B2
(45) **Date of Patent: *Mar. 17, 2026**

(54) LIQUID EJECTING HEAD AND LIQUID EJECTING APPARATUS

(71) Applicant: RISO Technologies Corporation, Tokyo (JP)

(72) Inventor: Masashi Shimosato, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 18/340,540

(22) Filed: Jun. 23, 2023

(65) Prior Publication Data

US 2024/0140091 A1 May 2, 2024

(30) Foreign Application Priority Data

Oct. 26, 2022 (JP) ................................. 2022-171781

(51) Int. Cl.
*B41J 2/14* (2006.01)

(52) U.S. Cl.
CPC ....... *B41J 2/14209* (2013.01); *B41J 2/14274* (2013.01); *B41J 2002/14217* (2013.01); *B41J 2002/14491* (2013.01); *B41J 2202/11* (2013.01)

(58) Field of Classification Search
CPC ................ B41J 2/14209; B41J 2/14274; B41J 2002/14217; B41J 2002/14491; B41J 2202/11

See application file for complete search history.

(56) References Cited

U.S. PATENT DOCUMENTS 5,631,680 A 5/1997 Sugahara
5,983,471 A * 11/1999 Osawa .................. B41J 2/1632 29/25.35

(Continued)

FOREIGN PATENT DOCUMENTS

CN 1406753 A 4/2003
CN 109484033 A 3/2019

(Continued)

OTHER PUBLICATIONS

Extended European Search Report dated Jan. 18, 2024, mailed in counterpart European Application No. 23190741.1, 7 pages.

(Continued)

*Primary Examiner* — Geoffrey S Mruk
(74) *Attorney, Agent, or Firm* — Kim & Stewart LLP

(57) ABSTRACT

According to one embodiment, a liquid ejection head, includes a piezoelectric member having grooves extending lengthwise in a first direction. The grooves separate the piezoelectric member into piezoelectric elements spaced from each other in a second direction. A connection portion of the piezoelectric member is under a portion of the grooves in a third direction and connects the piezoelectric elements to each other. Individual electrodes are on a first surface of the piezoelectric member on a first side. A common electrode is on a second surface of the piezoelectric member on a second side. Each groove has a depth on the first side that is deeper than a depth in an end portion on the second side. The depth of each groove in the end portion on the first side reaches through the piezoelectric member to a substrate.

12 Claims, 9 Drawing Sheets

(56) References Cited

U.S. PATENT DOCUMENTS

| | | | |
|---|---|---|---|
| 10,611,151 B2 | 4/2020 | Hirai | |
| 11,845,275 B2 | 12/2023 | Shimosato | |
| 2003/0051322 A1 | 3/2003 | Gutierrez | |
| 2006/0213051 A1 | 9/2006 | Sugahara | |
| 2008/0143795 A1 | 6/2008 | Hayashi | |
| 2022/0080732 A1 | 3/2022 | Nakano | |
| 2024/0140092 A1 * | 5/2024 | Shimosato | ........... B41J 2/14274 |

FOREIGN PATENT DOCUMENTS

| | | | |
|---|---|---|---|
| CN | 115122772 | A | 9/2022 |
| JP | 2007196438 | A | 8/2007 |
| JP | 5668382 | B2 | 2/2015 |
| JP | 2015044399 | A | 3/2015 |
| WO | 9510416 | A1 | 4/1995 |

OTHER PUBLICATIONS

U.S. Appl. No. 18/341,441, filed Jun. 26, 2023.
Chinese Office Action dated Jan. 23, 2026, mailed in counterpart Chinese Application No. 202310850996.4, 13 pages.

* cited by examiner

LIQUID EJECTING HEAD AND LIQUID EJECTING APPARATUS

CROSS-REFERENCE TO RELATED APPLICATION

This application is based upon and claims the benefit of priority from Japanese Patent Application No. 2022-171781, filed Oct. 26, 2022, the entire contents of which are incorporated herein by reference.

FIELD

Embodiments described herein relate generally to a liquid ejecting head and a liquid ejecting apparatus.

BACKGROUND

A piezoelectric actuator using a piezoelectric body such as lead zirconate titanate (PZT) can be used for driving of a liquid ejecting apparatus such as an inkjet printer head. Such an apparatus may adopt a configuration in which a plurality of grooves are formed in the piezoelectric body to serve as an actuator element. The piezoelectric body divided by the grooves provides separate columnar piezoelectric elements which may serve as individual actuators. External electrodes on one side of such actuators serve as individual electrodes to which driving voltages can be individually and selectively applied and external electrodes on the other side of the actuator may serve as a common electrode to which the same voltage (such as a ground voltage) is applied. The individual electrodes are separated (electrically distinct) and the different portions of the common electrode are all connected to one another. For example, the individual electrodes are separated from each other in some cases by cutting corners off on one side of the piezoelectric body. With such an actuator design, it may be difficult to provide sufficient mountability because the piezoelectric material can be fragile and the individual actuators are fine structures.

DETAILED DESCRIPTION

An exemplary embodiment provides a liquid ejecting head having improved mountability for use in a liquid ejecting apparatus or the like.

In general, according to one embodiment, a liquid ejection head includes piezoelectric member formed of a piezoelectric material. The piezoelectric member has a plurality of grooves extending lengthwise in a first direction. The grooves separate portions of the piezoelectric member into a plurality of piezoelectric elements spaced from each other in a second direction. A connection portion of the piezoelectric member is under at least a portion of the grooves in a third direction. The connection portion connects the plurality of piezoelectric elements to each other. A substrate is joined to the connection portion of the piezoelectric member. Individual electrodes are on a first surface of the piezoelectric member on a first side. A common electrode is on a second surface of the piezoelectric member on a second side. Each groove has a depth in an end portion of the groove on the first side that is deeper than a depth in an end portion of the groove on the second side. The depth of each groove in the end portion on the first side reaches through the piezoelectric member to the substrate.

Figure 1:
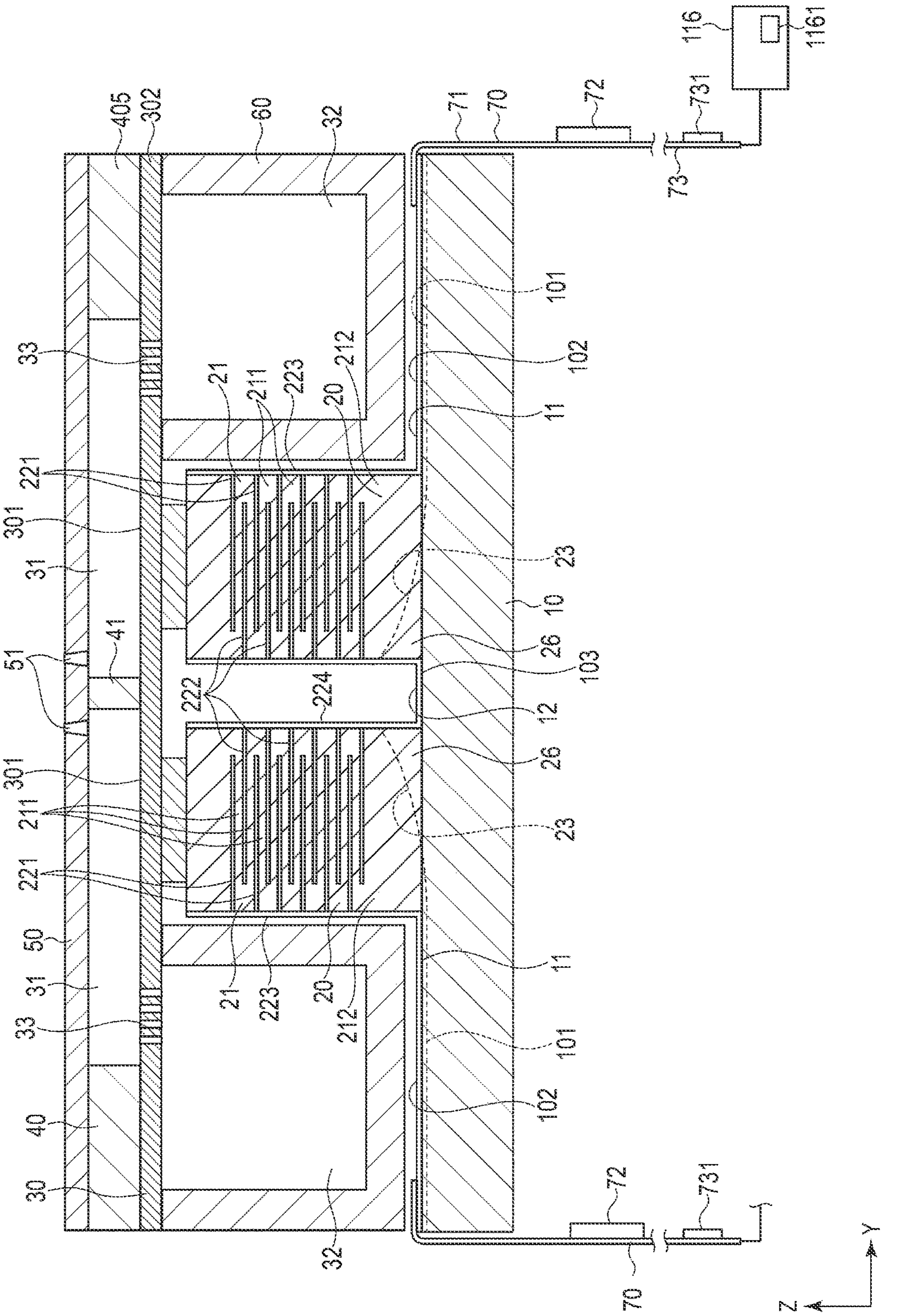
FIG. 1 is a cross-sectional view illustrating a configuration of an inkjet head according to an embodiment.
Figure 2:
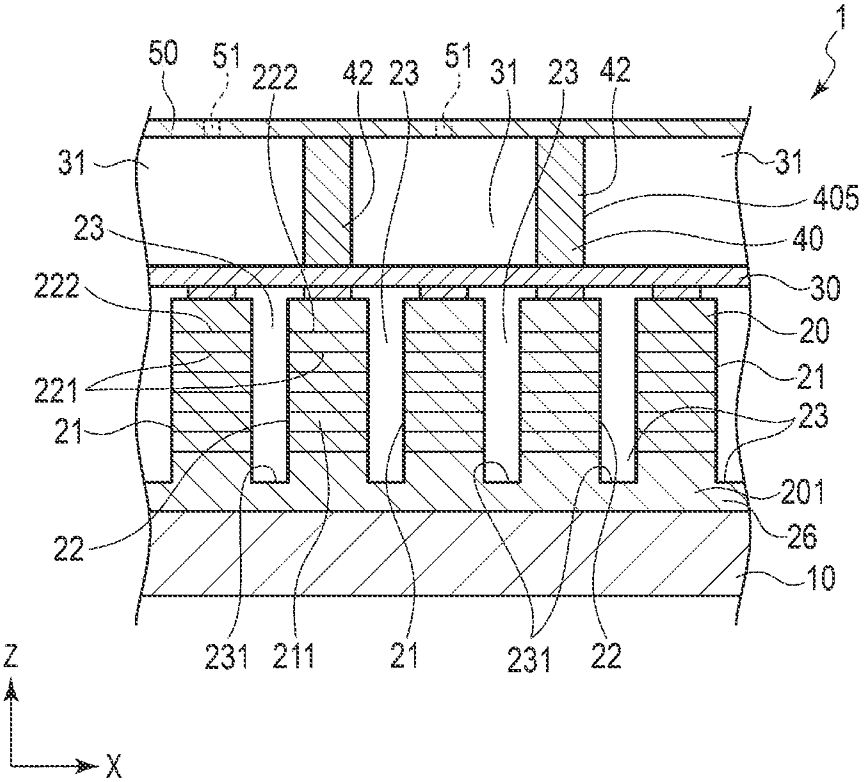
FIG. 2 is a cross-sectional view of an inkjet head according to an embodiment.
Figure 3:
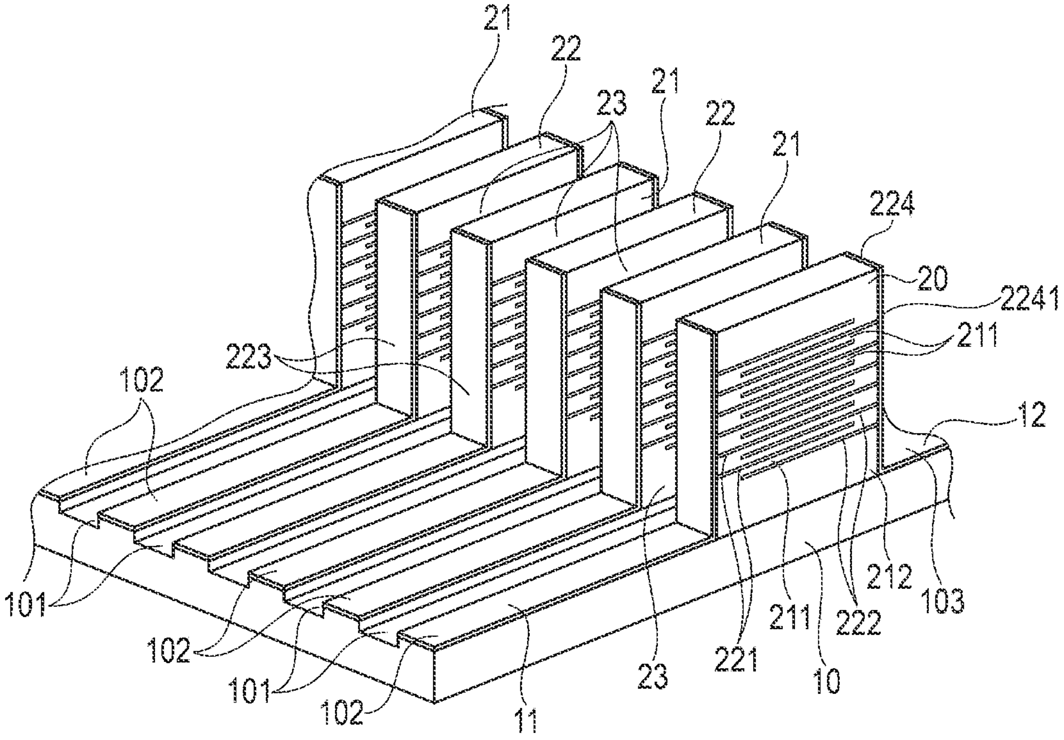
FIG. 3 is a perspective view illustrating a configuration of a part of an inkjet head according to an embodiment.
Figure 4:
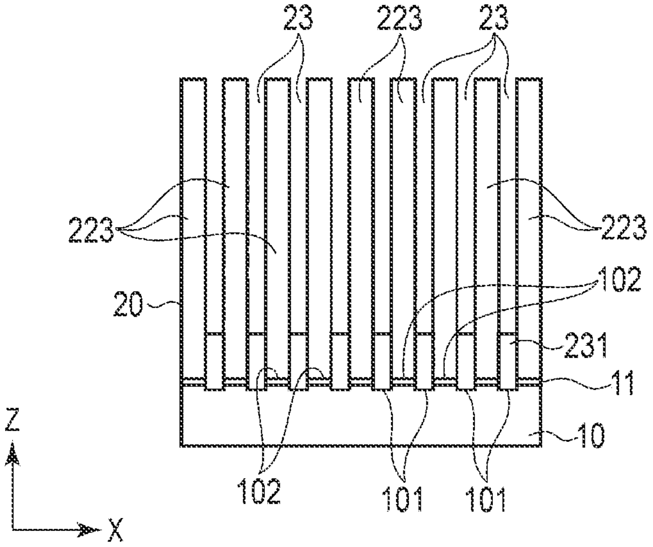
FIG. 4 is a side view illustrating a side of an actuator unit of an inkjet head according to an embodiment.
Figure 5:
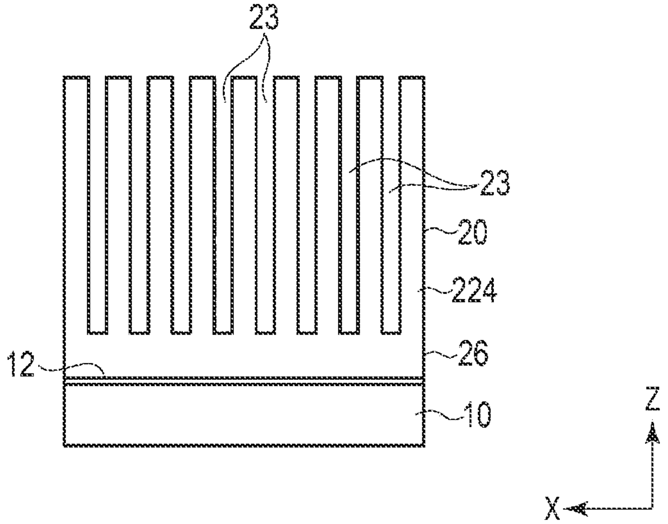
FIG. 5 is a side view illustrating another side of an inkjet head according to an embodiment.
Figure 6:
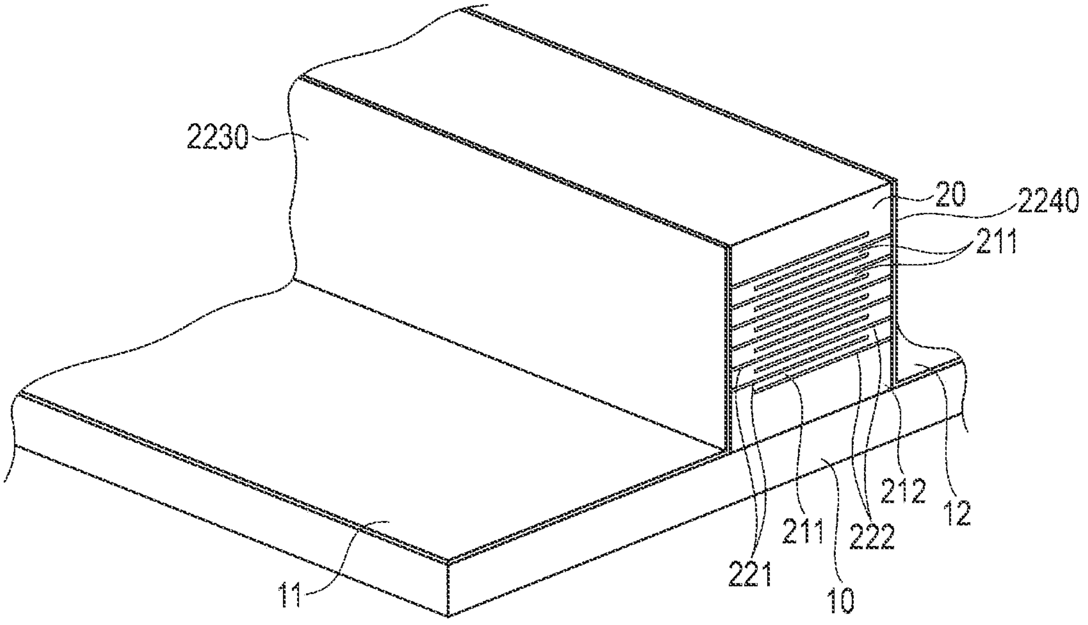
FIG. 6 is a diagram illustrating aspects of a method for manufacturing an inkjet head according to an embodiment.
Figure 7:
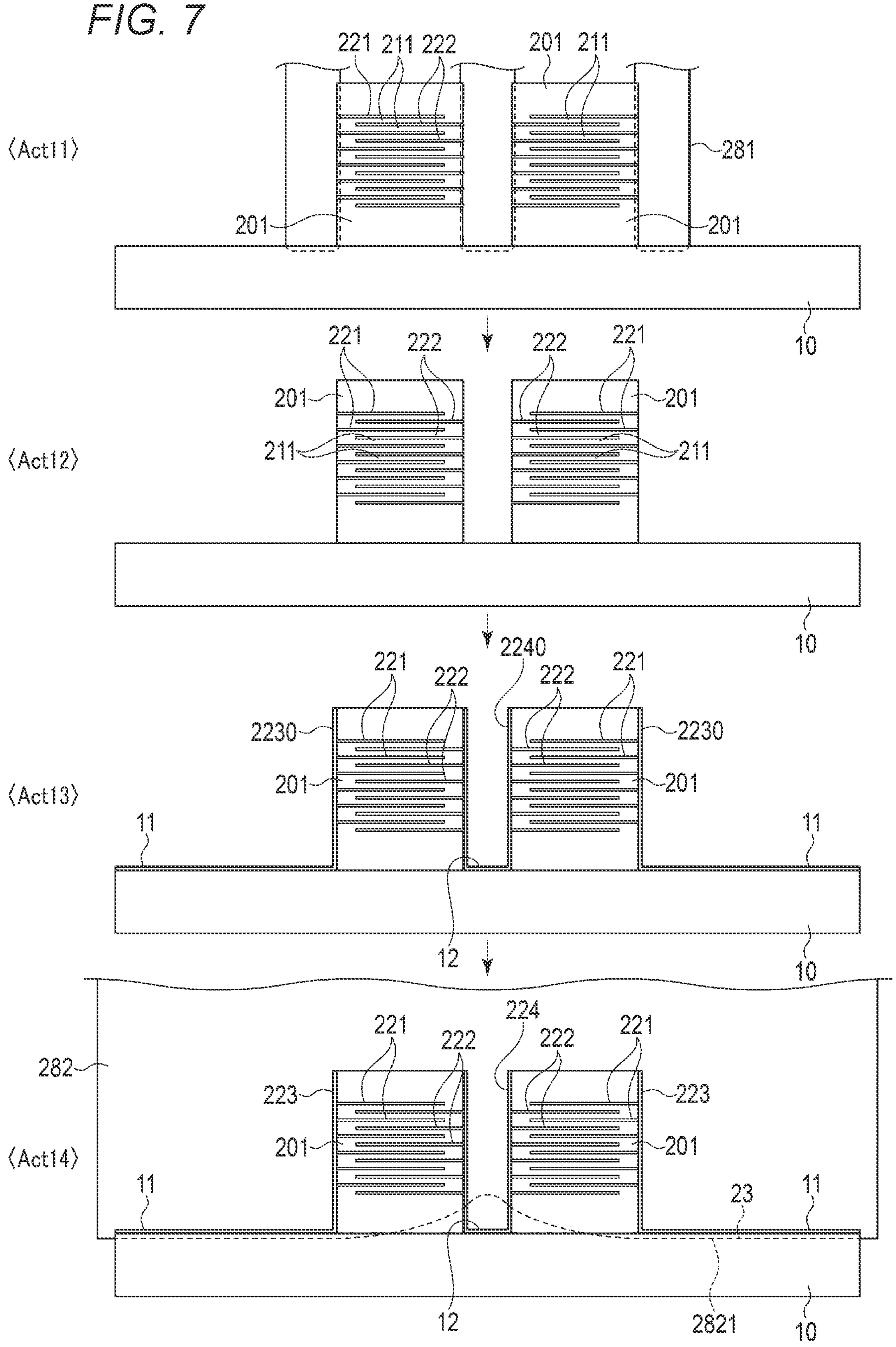
FIG. 7 is a diagram illustrating aspects of a method for manufacturing an inkjet head according to an embodiment.
Figure 8:
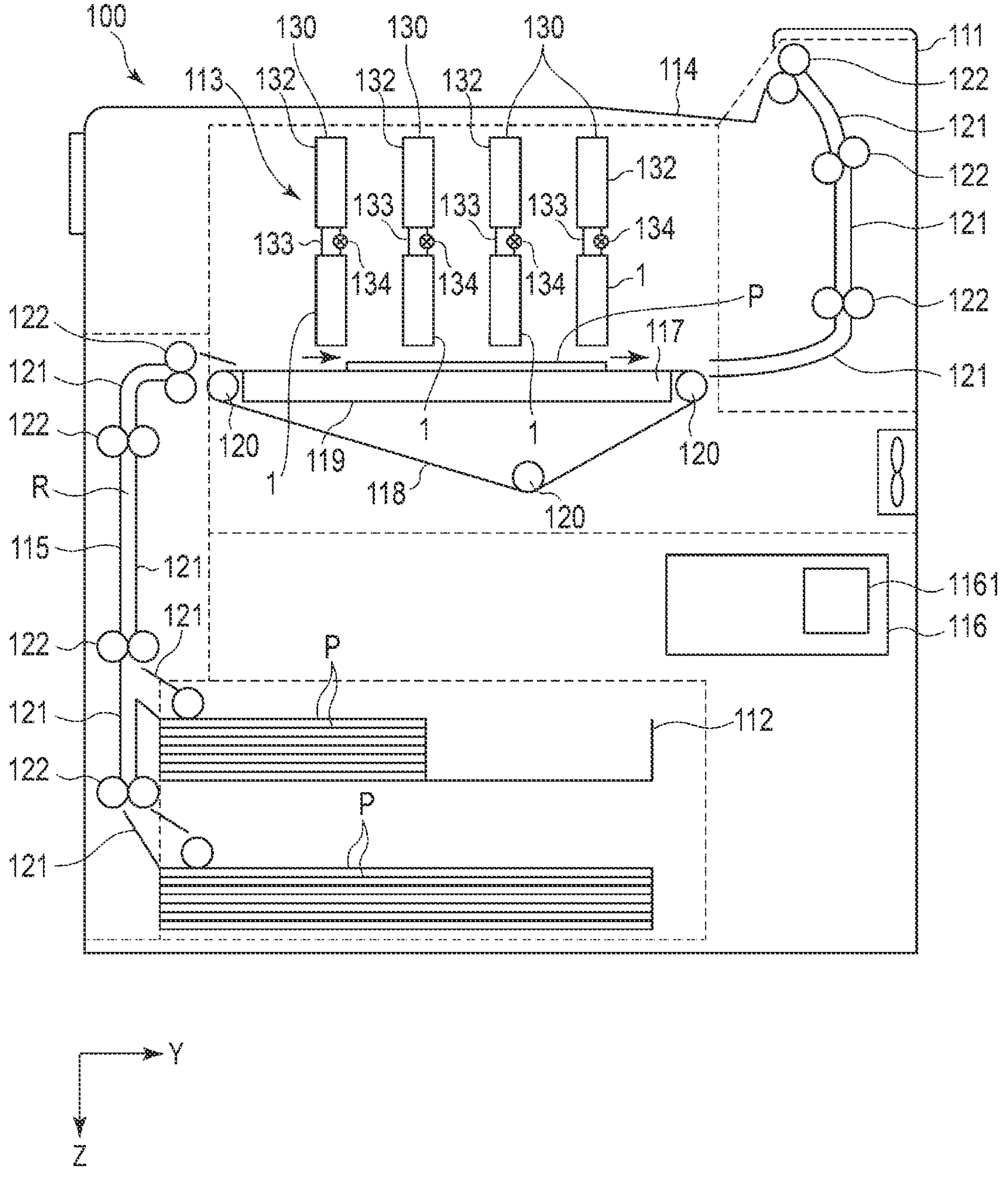
FIG. 8 is a diagram illustrating a schematic configuration of an inkjet recording apparatus.

Hereinafter, an inkjet head 1 (which is a liquid ejecting head) and an inkjet recording apparatus 100 (which is a liquid ejecting apparatus) according to certain example embodiments will be described with reference to FIGS. 1 to 8. FIGS. 1 and 2 are cross-sectional views illustrating schematic configurations of the inkjet head 1. FIG. 3 is a perspective view illustrating a configuration of a part of the inkjet head 1. FIG. 4 is a side view illustrating the individual electrode side, and FIG. 5 is a side view illustrating the common electrode side. FIGS. 6 and 7 are diagrams illustrating aspects of a method for manufacturing the inkjet head 1. FIG. 8 is a diagram illustrating a schematic configuration of the inkjet recording apparatus 100. In the drawings, arrows X, Y, and Z indicate three directions orthogonal to each other. To describe each drawing, elements, components, aspects or the like may be scaled up or down or omitted in some instances.

As illustrated in FIGS. 1 and 2, the inkjet head 1 includes a substrate 10, a pair of actuator units 20, a flow passage member 40, a nozzle plate 50 including a plurality of nozzles 51, a frame unit 60 (serving as a structure unit), and a driving circuit 70.

In this example, the inkjet head 1 includes two actuator units 20, two nozzle rows in which the plurality of nozzles 51 are arranged in a row direction (the X direction), two pressure chamber rows in which a plurality of pressure chambers 31 are arranged in the row direction, and two element rows in which a plurality of piezoelectric elements 21 and 22 are arranged in the row direction. In the present embodiment, an example in which a stacking direction of a plurality of piezoelectric layers 211, a vibration direction of each of the piezoelectric elements 21 and 22, and a vibration direction of a vibration plate 30 are oriented in the Z direction is given.

The substrate 10 is a circuit substrate that supports the pair of actuator units 20. The substrate 10 is configured in, for example, a plate shape and has a mounting surface oriented in an extension direction and a parallel direction. Electrode layers 11 and 12 are formed on the mounting surface of the substrate 10 on which the actuator units 20 are mounted. For example, on the mounting surface of the substrate 10, the electrode layers 11 configuring the individual electrodes are formed in an external region which is an opposite side to a side facing the pair of actuator units 20, and the electrode layers 12 configuring the common electrodes are formed in an internal region facing the pair of actuator units 20.

For example, a plurality of grooves 101 oriented in the extension direction are formed in external regions of both ends in the extension direction on the mounting surface of the substrate 10. The plurality of grooves 101 are arranged in the parallel direction and are formed continuously with grooves 23 of the actuator unit 20, which will be described below. On the mounting surface of the substrate 10, a predetermined wiring pattern (a wiring portion) including a plurality of individual wirings 102 is formed by separating the electrode layers 11 by the plurality of grooves 101. For example, the individual wirings 102 continue to external electrodes 223 formed on the lateral surface of the actuator unit 20 to form the individual electrodes.

On the mounting surface of the substrate 10, the electrode layer 12 formed in an internal region between the pair of actuator units 20 includes a common wiring 103. The common wiring 103 continues to external electrodes 224 of the actuator units 20 to form the common electrodes.

The actuator units 20 are joined to the mounting surface which is one side of the substrate 10. For example, two actuator units 20 are disposed side by side in the Y direction.

As illustrated in FIGS. 1 to 5, the actuator units 20 are configured with, for example, piezoelectric members and include a plurality of driving piezoelectric elements 21 and a plurality of non-driving piezoelectric elements 22 serving as actuators alternately arranged in the row direction, and a connection portion 26 integrally connecting the plurality of piezoelectric elements 21 and 22 on a substrate 10 side. The piezoelectric member is a stacked piezoelectric member 201 in which the plurality of piezoelectric layers 211 and a plurality of internal electrodes 221 and 222 are stacked.

In the actuator unit 20, the plurality of driving piezoelectric elements 21 and the plurality of non-driving piezoelectric elements 22 are arranged in one direction at a constant interval.

For example, the plurality of driving piezoelectric elements 21 and the plurality of non-driving piezoelectric elements 22 are both configured in a rectangular parallelepiped columnar shape having the same external shape. The actuator unit 20 is divided into a plurality of pieces by a plurality of grooves 23, and the plurality of driving piezoelectric elements 21 and the plurality of non-driving piezoelectric elements 22 are all arranged in the row direction at the same pitch by the grooves 23 with the same width.

Each groove 23 has a depth on the individual electrode side that is deeper than a depth on the common electrode side. On the individual electrode side, the depth of the grooves 23 reach the substrate 10. For example, when a groove 23 is formed in the Z direction from the upper side of the stacked piezoelectric member 201, the depth of the groove 23 is set so that one end portion is deeper than the other end portion. That is, by forming the groove 23 deeper than the end of the external electrode 223 portion forming the individual electrode on the substrate 10, the external electrode 223 is divided into a plurality of pieces to form the plurality of individual electrodes. On the other side of the stacked piezoelectric member 201, the groove 23 is shallower than the bottom of the external electrode 224 on the substrate 10 side, and the portions of external electrode 224 thus remain connected to each other on the substrate 10 side.

A groove 23 has a depth reaching to the substrate 10 on at least one side. In other words, the grooves 23 formed for the pair of actuator units 20 are continuous with the plurality of grooves 101 formed on a surface layer portion of the substrate 10. For example, by performing a grooving process simultaneously with a common tool on the grooves 23, the stacked piezoelectric member 201, and the substrate 10, the grooves 23 of the actuator units 20 and the grooves 101 of the substrate 10 are simultaneously formed in the same process. In a region on the common electrode side, the grooves 23 are formed more shallowly and the stacked piezoelectric member 201 partially remains after the grooving process. Accordingly, in the region of the substrate 10 on the common electrode side, grooves are not formed and the electrode layers 12 can thus form the common wiring 103 in an integrally continuous state.

For example, the plurality of driving piezoelectric elements 21 and the plurality of non-driving piezoelectric elements 22 are each formed in a rectangular shape in which a transverse direction is oriented in the row direction of the element row and a longitudinal direction is oriented in an extension direction orthogonal to the row direction and the Z direction in a plan view when viewed in the Z direction.

The driving piezoelectric elements 21 are arranged at positions facing the plurality of pressure chambers 31 formed in the flow passage member 40. For example, central positions of the driving piezoelectric elements 21 in the row direction and the extension direction and central positions of the pressure chambers 31 in the row direction and the extension direction are arranged side by side in the Z direction.

The non-driving piezoelectric elements 22 are arranged at positions facing a plurality of partition walls 42 formed in the flow passage member 40. For example, central positions of the non-driving piezoelectric elements 22 in the row direction and the extension direction and central positions of the partition walls 42 in the row direction and the extension direction are arranged side by side in the Z direction.

For example, in the actuator unit 20, a plurality of piezoelectric elements formed in a rectangular columnar shape are formed at a predetermined interval by forming the grooves 23 by dicing of the stacked piezoelectric member 201 joined in advance to the substrate 10. Electrodes or the like are provided in the plurality of formed columnar elements, and the plurality of driving piezoelectric elements 21 and the plurality of non-driving piezoelectric elements 22 alternately disposed are thus formed. The plurality of driving piezoelectric elements 21 and the plurality of non-driving piezoelectric elements 22 are disposed alternately in parallel with the grooves 23 interposed therebetween in the row direction.

For example, the stacked piezoelectric member 201 for the actuator unit 20 is formed by stacking and baking separate sheets or layers of piezoelectric material.

A piezoelectric member of the driving piezoelectric element 21 and the non-driving piezoelectric element 22 is, for example, the stacked piezoelectric member 201. The driving piezoelectric element 21 and the non-driving piezoelectric element 22 include stacked piezoelectric layers 211 and internal electrodes 221 and 222 formed on a piezoelectric layer 211. For example, the driving piezoelectric element 21 and the non-driving piezoelectric element 22 have the same stacked structure. The driving piezoelectric element 21 and the non-driving piezoelectric element 22 include external electrodes 223 and 224 formed on outer surfaces thereof.

Each piezoelectric layer 211 is formed, for example, as a thin sheet of a piezoelectric ceramic material such as a lead zirconate titanate (PZT)-based or lead-free sodium potassium niobate (KNN)-based material. A plurality of piezoelectric layers 211 are stacked and adhered to each other. For example, the thickness direction and the stacking direction of the piezoelectric layers 211 in the present embodiment are disposed in the vibration direction (the Z direction).

The internal electrodes 221 and 222 are conductive films formed of a bakeable conductive material such as silver palladium. The internal electrodes 221 and 222 are formed in a predetermined region on the piezoelectric layers 211. The internal electrodes 221 and 222 are intended to have mutually different polarity. For example, each internal electrode 221 is formed in a region which reaches a first end of the piezoelectric layer 211 in the extension direction (the Y direction) but does not reach the other end (second end) of the piezoelectric layer 211. The other internal electrode 222 is formed in a region which does not reach the first end of the piezoelectric layer 211 but does reaches the second end of the piezoelectric layer 211. The internal electrodes 221 and 222 are connected to the external electrodes 223 and 224 formed on the lateral surfaces of the piezoelectric elements 21 and 22, respectively.

The stacked piezoelectric member 201 of the driving piezoelectric elements 21 and the non-driving piezoelectric elements 22 further includes a dummy layer 212 at one or both of ends (lower and upper ends) on the substrate 10 side and a nozzle plate 50 side. The dummy layer 212 is formed of, for example, the same material as that of the piezoelectric layer 211, but is not deformed during ejection operations since an electrode is formed on only one side and thus an electric field is not applied thereto. For example, the dummy layer 212 does not function as a piezoelectric body, but serves as a base for fixing the actuator unit 20 to the substrate 10, or serves as a polishing margin used when polished for dimensional accuracy during assembly or after assembly.

The external electrodes 223 and 224 are formed on the surfaces of the driving piezoelectric elements 21 and the non-driving piezoelectric elements 22 by collecting ends of the internal electrodes 221 and 222. For example, the external electrodes 223 are formed on one end surface of the piezoelectric layer 211 in the extension direction. The external electrodes 224 are formed on the other end surface of the piezoelectric layer 211 in the extension direction. The external electrodes 224 are continuous with (connected to) the common wiring 103 formed by the electrode layer 12 of the piezoelectric layer 211 on the substrate 10.

The external electrodes 223 and 224 can be formed as a film of nickel (Ni), chromium (Cr), gold (Au), or the like using a known method such as a plating or sputtering method. The external electrodes 223 and 224 have different polarities in operation. The external electrodes 223 and 224 are disposed on different lateral surfaces of the driving piezoelectric elements 21 and the non-driving piezoelectric elements 22.

As an example in the present embodiment, each external electrode 223 serves as an individual electrode and the external electrode 224 serves as a common electrode. Electrode layer(s) 2230 formed on one lateral surface of the stacked piezoelectric member 201 in a manufacturing process are divided by the grooves 23, as illustrated in FIGS. 6 and 7, and thus the external electrodes 223 serving as the individual electrodes for the plurality of driving piezoelectric elements 21 and the plurality of non-driving piezoelectric elements 22 are formed to be separate/distinct electrodes. That is, for the external electrodes 223 on one side, the grooves 23 extend deeper than a bottom of the electrode layer 2230 on the substrate 10 side, and the electrode layer 2230 is thus separated into independent portions, separate from each other to form the external electrodes 223 serving as the plurality of individual electrodes.

The external electrodes 223 are connected to the driving circuit 70 via an FPC 71 serving as a flexible substrate, which is an example of a wiring substrate, via the individual wiring 102 on the substrate 10. For example, each individual external electrode 223 is connected to a control unit 116 serving as a driving unit via a driving IC 72 of the driving circuit 70 by the FPC 71 and is configured so that individual driving can be controlled under the control of a control circuit 1161. In some examples, the external electrode 224 may be routed to a lateral surface on the same side as the external electrodes 223 and may also be connected to the driving circuit 70 via the FPC 71.

For the external electrode 224 formed on the other side of the actuator from external electrode 223, the groove 23 is formed to be shallower than the bottom of the electrode layer 2240, and a common electrode is thus formed in which an electrode layer 2240 remains continuous at the substrate 10 side rather than be separated at the bottom of the groove 23. The portions of the external electrode 224 are connected to each other on the lateral surface of the stacked piezoelectric member 201 opposite to the external electrodes 223 and are connected to the common wiring 103 on the substrate 10, for example, for grounding.

The dummy layer 212 is formed of the same material as that of the piezoelectric layer 211. The dummy layer 212 is not deformed in operation since an electrode is formed on only one side and an electric field is thus not applied. That is, the dummy layer 212 does not function as an active piezoelectric material/element, but rather simply serves as the base for fixing to substrate 10 or as polishing margin during assembly or after assembly.

The vibration direction of each of the piezoelectric elements 21 and 22 is oriented in the stacking direction and is displaced in a d33 direction by applying an electric field.

For example, each of the piezoelectric elements 21 and 22 has from 3 to 50 layers stacked one on the other, with a thickness of each layer being 10 μm to 40 μm. The thickness of the total stack is set to be less than 1,000 μm.

The driving piezoelectric elements 21 vibrate when a voltage is applied across the internal electrodes 221 and 222 via the external electrodes 223 and 224. In the present embodiment, the driving piezoelectric elements 21 vertically vibrate in the stacking direction of the piezoelectric layers 211. The vertical vibration mentioned herein is, for example, "vibration in a thickness direction defined by a piezoelectric constant d33". The driving piezoelectric elements 21 displace the vibration plate 30 through the vertical vibration to deform the pressure chambers 31.

The flow passage member 40 includes the vibration plate 30 disposed to face the actuator unit 20 in a deformation direction and a flow passage substrate 405 stacked on the vibration plate 30.

The vibration plate 30 is provided between the flow passage substrate 405 and the actuator units 20 in the vibration direction. The vibration plate 30 forms a part of the flow passage member 40 together with the flow passage substrate 405. The vibration plate 30 extends in a direction intersecting the lateral surface on which the individual electrodes and the common electrodes of the stacked piezoelectric member 201 are formed.

The vibration plate 30 extends orthogonal to the vibration direction and is joined to the piezoelectric layers 211 of the plurality of piezoelectric elements 21 and 22. The vibration plate 30 is configured to be deformable. The vibration plate 30 is joined to the driving piezoelectric elements 21 and the non-driving piezoelectric elements 22 of the actuator units 20 and the frame unit 60. For example, the vibration plate 30 includes a vibration region 301 facing the piezoelectric elements 21 and 22 and a support region 302 facing the frame unit 60.

The vibration region 301 has, for example, a plate shape. The vibration plate 30 is, for example, a metal plate. The vibration plate 30 in this example has a plurality of vibration portions which individually face each pressure chamber 31 and can be displaced individually. The vibration plate 30 can be formed by integrally connecting the plurality of vibration portions.

For example, the vibration plate 30 is formed of nickel or a stainless steel (SUS) plate and a thickness dimension in the vibration direction is about 5 μm to 15 μm. In the vibration region 301, creases or steps may be formed at edges of the vibration portions or between the vibration portions adjacent to each other so that the plurality of vibration portions can be more easily displaced. The vibration region 301 is deformed when portions disposed to face the driving piezoelectric elements 21 are displaced through expansion and compression of the driving piezoelectric elements 21. For example, the vibration plate 30 is formed by an electroforming method or the like since a very thin and complicated shape is generally necessary. The vibration plate 30 is joined to the upper end surfaces of the actuator units 20 by an adhesive or the like.

The support region 302 is a plate-shaped member disposed between the frame unit 60 and the flow passage substrate 405. The support region 302 includes a communication portion 33 that has a through-hole communicating with a common chamber 32.

For example, the communication portion 33 can be a through hole with a filter member (material) therein that has many pores through which a liquid can pass.

The flow passage substrate 405 is disposed between the nozzle plate 50 and the vibration plate 30. The flow passage substrate 405 is joined to one side of the vibration plate 30.

The flow passage substrate 405 includes wall members such as a guide wall 41 and partition walls 42, and predetermined ink flow passages including the plurality of partitioned pressure chambers 31 or a plurality of partitioned individual flow passages communicating with the pressure chambers 31 and the common chamber 32 are thereby formed.

Inside the flow passage substrate 405, the plurality of pressure chambers 31 are partitioned by the partition walls 42. That is, both sides of the pressure chambers 31 in the parallel direction are formed by partition walls 42. The pressure chambers 31 connect to the nozzles 51 formed in the nozzle plate 50. In the pressure chambers 31, a side opposite to the nozzle plate 50 is closed by the vibration plate 30.

The pressure chambers 31 are spaces formed on one side of the vibration region 301 and communicate with the common chamber 32 via an individual flow passage or the communication portion 33. The each of the pressure chambers 31 connect to one of the nozzles 51 formed in the nozzle plate 50. In the pressure chambers 31, the side opposite to the nozzle plate 50 is closed by the vibration plate 30.

The plurality of pressure chambers 31 retain therein a liquid supplied from the common chamber 32 and are deformed by vibration of the vibration plate 30 to eject the liquid from the respective nozzles 51.

The partition walls 42 are wall members that partition the plurality of pressure chambers 31 arranged in the parallel direction, and configure both lateral portions of the pressure chambers 31. The partition walls 42 are disposed to face the non-driving piezoelectric elements 22 via the vibration plate 30 and are thus supported by the non-driving piezoelectric elements 22. The plurality of partition walls 42 are provided at the same pitch as a pitch at which the plurality of pressure chambers 31 are arranged.

The nozzle plate 50 is formed in a rectangular plate shape with a thickness of about 10 μm to 100 μm and formed of, for example, a metal such as SUS-Ni (nickel-steel alloy) or a resin such as a polyimide. The nozzle plate 50 is disposed on one side of the flow passage substrate 405 to cover an opening on one side of the pressure chambers 31.

The plurality of nozzles 51 are arranged in the same as the arrangement direction of the pressure chambers 31 to form nozzle rows. For example, the nozzles 51 are provided in two rows and the nozzles 51 are provided at positions corresponding to each of the plurality of pressure chambers 31 arranged in two rows. In the present embodiment, the nozzles 51 are provided at positions near an end of the pressure chambers 31.

The frame unit 60 is a structure joined to the vibration plate 30 together with the piezoelectric elements 21 and 22. The frame unit 60 is provided on the side of the piezoelectric elements 21 and 22 and the vibration plate 30 opposite to the flow passage substrate 405 and is, for example, disposed to be adjacent to the actuator unit 20 in the present embodiment. The frame unit 60 configures the outline (outer perimeter shape) of the inkjet head 1. The frame unit 60 may also include or form a liquid flow passage inside the frame outline. In the present embodiment, the frame unit 60 is joined to the other side of the vibration plate 30 to form the common chamber 32 between the frame unit 60 and the vibration plate 30.

The common chamber 32 is formed inside the frame unit 60 and communicates with the pressure chambers 31 via the individual flow passages and the communication portion 33 provided in the vibration plate 30.

The driving circuit 70 includes a flexible printed circuit (FPC) 71 connected to the actuator units 20 via the individual wirings 102 and the common wiring 103 on the mounting surface of the substrate 10, the driving IC 72 mounted on the FPC 71, and a printed wiring substrate 73 mounted on the other end of the FPC 71.

The driving circuit 70 drives the driving piezoelectric elements 21 by applying a driving voltage to the external electrodes 223 and 224 by the driving IC 72 and ejects liquid droplets from the nozzles 51 by increasing and decreasing volumes of the pressure chambers 31.

The FPC 71 is connected to the plurality of external electrodes 223 and 224 of the actuator units 20 via the individual wirings 102 and the common wiring 103, the external electrodes 223 and 224 being connected to the mounting surface of the substrate 10. As the FPC 71, a chip-on film (COF) on which the driving IC 72 is mounted as an electronic component can be used.

The driving IC 72 is connected to the external electrodes 223 and 224 via the FPC 71. The driving IC 72 is an electronic component used for ejection control.

The driving IC 72 generates a control signal and a driving signal for operating each driving piezoelectric element 21. The driving IC 72 generates a control signal for control such as an ink ejection timing or selection of the driving piezoelectric elements 21 ejecting ink in accordance with an image signal input from the control unit 116 of the inkjet recording apparatus 100 on which the inkjet head 1 is mounted. The driving IC 72 generates a voltage to be applied to the driving piezoelectric elements 21, that is, a driving signal, in accordance with the control signal from the control unit 116. When the driving IC 72 applies the driving signal to the driving piezoelectric elements 21, the driving piezoelectric elements 21 are driven to displace the vibration plate 30 and change the volumes of the pressure chambers 31. Accordingly, the ink in a pressure chamber 31 experiences a pressure vibration. Because of this pressure vibration, the ink can be ejected from the nozzle 51 connected to the pressure chamber 31.

In some examples, inkjet head 1 may be configured to realize grayscale expression by changing the amount of ink droplets to be landed per pixel. The inkjet head 1 may be configured so that the amount of ink droplets to be landed per pixel can be varied by changing the number of times the ink is ejected (number of droplets). In this way, the driving IC 72 is an example of an application unit that applies the driving signal to the driving piezoelectric elements 21.

For example, the driving IC 72 includes a data buffer, a decoder, and a driver. The data buffer stores time-series printing data for each driving piezoelectric element 21. The decoder controls the driver based on the printing data stored in the data buffer for each driving piezoelectric element 21. The driver outputs the driving signal for operating each driving piezoelectric element 21 under the control of the decoder. The driving signal is, for example, a voltage to be applied to each driving piezoelectric element 21.

The printed wiring substrate 73 may be a printing wiring assembly (PWA) on which various electronic components or connectors are mounted. The printed wiring substrate 73 includes a head control circuit 731. The printed wiring substrate 73 is connected to the control unit 116 of the inkjet recording apparatus 100.

In the inkjet head 1, ink flow passages including the plurality of pressure chambers 31 communicating with the nozzles 51 and the common chamber(s) 32 respectively communicating with the plurality of pressure chambers 31 are formed by the nozzle plate 50, the frame unit 60, the flow passage substrate 405, and the vibration plate 30. For example, the common chamber 32 connects to a cartridge so that ink can be supplied to each pressure chamber 31 via the common chamber 32. All the driving piezoelectric elements 21 are connected to wirings so that a voltage can be applied by these wirings. In the inkjet head 1, the driving piezoelectric elements 21 are targeted to be driven when the control unit 116 of the inkjet recording apparatus 100 determines to apply the driving voltage to the electrodes 221 and 222 by the driving IC 72. The driving piezoelectric elements 21 vertically vibrate in this example.

Specifically, the control unit 116 applies the driving voltage to the internal electrodes 221 and 222 of the targeted driving piezoelectric elements 21 to selectively drive the driving piezoelectric elements 21 as appropriate in view of image data or the like being printed. Then, by deforming (vibrating up-down) the vibration plate 30 and thus changing the volumes of the pressure chambers 31, a liquid is drawn from the common chamber 32 and ejected from the nozzles 51.

An example of a method for manufacturing the inkjet head 1 according to the present embodiment will be described. First, the internal electrodes 221 and 222 are formed by a printing process (e.g., a photolithographic process). The plurality of piezoelectric layers 211 (and the internal electrodes 221 and 222 formed thereon) are stacked to form the stacked piezoelectric member 201 in a baking process and a polarization process.

Then, as illustrated in FIG. 6, by performing the polarization process on the driving piezoelectric elements 21 of the stacked piezoelectric member 201 in which the internal electrodes 221 and 222 are already formed in advance, the driving piezoelectric elements 21 can be attached to the substrate 10 with an adhesive or the like. For example, if two actuator units 20 are formed, the stacked piezoelectric member 201 may be divided into two by a grooving process after the stacked piezoelectric member 201 is joined to the substrate 10, or, alternatively, two stacked piezoelectric members 201 for the two actuator units 20 may be prepared separately and each mounted to the substrate 10 or the like.

As illustrated in FIG. 7, the stacked piezoelectric member 201 is disposed on the substrate 10, and the surface of the substrate 10 and the surface of the stacked piezoelectric member 201 are subjected to surface machining by a tool 281 such as a diamond cutter (Act11), and the mounting surface and the external surface of the stacked piezoelectric member 201 are formed (Act12). Accordingly, it is possible to guarantee flatness of the upper surface of the actuator unit 20 to which the vibration plate 30 is to be joined in a subsequent process.

Subsequently, the electrode layers 2230 and 2240 serving as the external electrodes 223 and 224 are formed on both end surfaces of the stacked piezoelectric member 201 by the printing process, and the electrode layers 11 and 12 are formed on the surface of the substrate 10 (Act13). For example, electrodes may also be formed on the apex portion (top surface) of the actuator unit 20. In this case, the external electrodes 223 and 224 can be separated from each other by subsequently removing the electrode portions on the apex portion of the actuator unit 20 by polishing or the like.

Subsequently, the plurality of grooves 23 are formed in the actuator units 20 by moving a tool 282 such as a diamond cutter in the Z direction and processing (Act14). For example, in the present embodiment, as illustrated in FIG. 7, a bottom surface 231 of the groove 23 is formed in a curved shape gradually getting shallower from one side to the other side in the extension direction by forming the grooves 23 using a tool 282 that has a cutting portion 2821 that is curved and gets gradually shallower from one side to the other side in the extension direction. Here, by forming the grooves 23 at one end with a depth through the entire length of the electrode layer 2230 in the depth direction, as illustrated in FIG. 4, the external electrodes 223 serving as the independent individual electrodes separating the plurality of electrode layers 2230 from each other are formed. By limiting the depth of the grooves 23 at the other end to not go through the entire depth of the electrode layer 2240, as illustrated in FIG. 5, the external electrode 224 serving as the common electrode in which the electrode layers 2240 remain in the region closer to the substrate 10 is formed. In this process, in the surface layer portion of the substrate 10, the grooves 101 can be simultaneously formed in the electrode layers 11 formed in the region on the individual electrode side.

As described above, the stacked piezoelectric member 201 in which the electrode layer on one end side is divided into a plurality of pieces and the electrode layers on the other end side are connected to each other on the substrate 10 side is formed. At this time, by forming the plurality of grooves 23 simultaneously at a predetermined pitch and dividing the stacked piezoelectric member 201 into the plurality of pieces, a plurality of columnar elements serving as the plurality of piezoelectric elements 21 and 22 arranged at the same pitch are formed. In this way, the plurality of driving piezoelectric elements 21 and the plurality of non-driving piezoelectric elements 22 arranged at the same pitch are formed.

The electrode layers 11 on the mounting surface of the substrate 10 are separated by forming the grooves 101, and a predetermined wiring pattern including the plurality of individual wirings 102 can be formed.

Further, the FPC 71 on which an electronic component such as the driving IC 72 is mounted as a control component in a wiring pattern such as the individual wirings 102 or the common wiring 103 formed in a predetermined shape on the substrate 10 is connected by, for example, solder mounting or an anisotropic conductive film (ACF). The printed wiring substrate 73 including the head control circuit 731 is connected to the FPC 71.

The vibration plate 30, the flow passage substrate 405, and the nozzle plate 50 are stacked and positioned on the actuator units 20 with joining materials (e.g., adhesive) interposed therebetween, the frame units 60 are disposed on the outer circumference of the actuator units 20, the plurality of members are joined to complete the inkjet head 1.

Hereinafter, an example of the inkjet recording apparatus 100 including an inkjet head 1 will be described with reference to FIG. 8. The inkjet recording apparatus 100 includes a casing 111, a medium supply unit 112, an image forming unit 113, a medium discharging unit 114, a conveyance device 115, and a control unit 116.

The inkjet recording apparatus 100 is a liquid ejecting apparatus that performs an image forming process on a sheet P by ejecting a liquid such as ink while conveying the sheet P from the medium supply unit 112 through the image forming unit 113 along a predetermined conveyance path R reaching the medium discharging unit 114.

The casing 111 forms the outside of the inkjet recording apparatus 100. A discharging port through which the sheet P can be discharged is included at a predetermined portion of the casing 111.

The medium supply unit 112 includes a plurality of feeding cassettes and is configured so that the plurality of sheets P with various sizes can be stacked and retained.

The medium discharging unit 114 includes a discharging tray configured to retain the sheet P discharged from the discharging port.

The image forming unit 113 includes a support unit 117 that supports the sheet P and includes a plurality of head units 130 disposed to face the upper side of the support unit 117.

The support unit 117 includes a conveyance belt 118 that is provided in a loop shape in a predetermined region where image forming is performed, a support plate 119 that supports the conveyance belt 118 from a rear side, and a plurality of belt rollers 120 provided on the rear side of the conveyance belt 118.

The support unit 117 conveys the sheet P downstream while supporting the sheet P on the upper surface of the conveyance belt 118 and feeds the sheet on the conveyance belt 118 at a predetermined timing by rotation of the belt rollers 120.

The head unit 130 includes a plurality of inkjet heads 1 (four-color heads), ink tanks 132 mounted respectively on the inkjet heads 1, connection flow passages 133 connecting the inkjet heads 1 to the ink tanks 132, and supply pumps 134.

In the present embodiment, inkjet heads 1 for four colors (cyan, magenta, yellow, and black) and the ink tanks 132 for containing the ink of these four colors are included. The ink tanks 132 are connected to the inkjet heads 1 by the connection flow passages 133.

A negative pressure control device such as a pump can be connected to the ink tank 132. By performing negative control on the inside of the ink tank 132 by the negative pressure control device in accordance with water head values (hydrological head pressures) in the inkjet head 1 and the ink tank 132, the ink supplied to each nozzle 51 of the inkjet head 1 can be formed in a meniscus of a predetermined shape.

The supply pump 134 is, for example, a liquid feeding pump configured with a piezoelectric pump. The supply pump 134 is provided in a supply flow passage. The supply pump 134 is connected to the control circuit 1161 of the control unit 116 by a wiring and is configured so that the supply pump 134 can be controlled by the control unit 116. The supply pump 134 supplies a liquid to the inkjet head 1.

The conveyance device 115 conveys the sheet P from the medium supply unit 112 through the image forming unit 113 along the conveyance path R reaching the medium discharging unit 114. The conveyance device 115 includes a plurality of guide plate pairs 121 disposed along the conveyance path R and a plurality of conveyance rollers 122.

Each of the guide plate pairs 121 includes a pair of plate members disposed to face each other with the conveyed sheet P configured to pass therebetween to guide the sheet P along the conveyance path R.

The conveyance rollers 122 are driven to be rotated under the control of the control unit 116 so that the sheet P is conveyed downstream along the conveyance path R. In the conveyance path R, a sensor detecting a sheet conveyance status is disposed at various positions.

The control unit 116 includes a control unit 1161 such as a CPU (central processing unit) which is a controller, a read-only memory (ROM) that stores various programs and the like, a random access memory (RAM) that temporarily stores various types of variable data, image data, and the like, and an interface unit that receives data from the outside and outputs data to the outside.

In the inkjet recording apparatus 100, when a printing instruction is given by a user operating an operation input unit (user interface) is detected, the control unit 116 drives the inkjet heads 1 and the conveyance device 115 to convey the sheet P. The inkjet heads 1 are driven by outputting of a printing signal to the head units 130 at a predetermined timing. The inkjet heads 1 generate a driving signal for an ejection operation according to an image (print) signal established in accordance with image data. The driving voltages are applied to the internal electrodes 221 and 222 to selectively drive the piezoelectric elements 21 of the ejection target to vertically vibrate the driving piezoelectric elements 21 to form an image on the sheet P on the conveyance belt 118. As a liquid ejecting operation, the control unit 116 supplies the ink from the ink tanks 132 to the common chambers 32 of the inkjet heads 1 by driving the supply pumps 134.

A driving operation of driving the inkjet head 1 will be described. The inkjet head 1 according to the present embodiment includes the driving piezoelectric element 21 disposed to face the pressure chamber 31, and the driving piezoelectric element 21 is connected by a wiring so that a voltage can be applied. The control unit 116 transmits a driving signal to the driving IC 72 by an image signal in accordance with image data, applies a driving voltage to the internal electrodes 221 and 222 of the driving piezoelectric element 21 of the driving target, and selectively deforms the driving piezoelectric element 21 of the driving target. Then, a liquid is ejected by changing the volume of the pressure chamber 31 in combination of deformation in the tensile direction and deformation in the compression direction of the vibration plate 30.

For example, the control unit 116 alternately performs a expansion operation and a compression operation. In the inkjet head 1, in the expansion operation of increasing an internal volume of a pressure chamber 31, the driving piezoelectric element 21 of the driving target is contracted and the driving piezoelectric element 21 which is not the driving target is not deformed (changed). In the inkjet head 1, in the compression operation of decreasing the internal volume of the target pressure chamber 31, the driving piezoelectric element 21 of the driving target is expanded. The non-driving piezoelectric element 22 is not deformed.

According to the inkjet head 1 and the inkjet recording apparatus 100 according to an embodiment, a liquid ejecting head and a liquid ejecting apparatus with improved mountability can be provided. That is, by adjusting the depth of the grooves 23 when the grooves 23 are processed (fabricated), it is possible to form the plurality of individual electrodes as separated from each other and the continuous common electrodes easily, while improving the mountability of the FPC or the like to the piezoelectric body. For example, in the inkjet head 1 and the inkjet recording apparatus 100, by forming the wirings in the substrate 10 and forming the grooves 23 and 101 simultaneously in the actuator units 20 and the substrate 10, it is possible to connect the wirings on the substrate 10 to the actuator units 20 easily and accurately, and then mount an FPC or the like to the substrate 10. Therefore, connection strength can be guaranteed and thus reliability is improved, and a thinner type head can be formed without requiring the connection portion 26 to be formed more thickly. According to the inkjet head 1 and the inkjet recording apparatus 100, manufacturing processing steps can be reduced as compared with a case where parts of lateral surfaces are cut to separate the individual electrodes. Since an area of the common electrode can be guaranteed easily, an increase in resistance of the common electrode can be inhibited and high printing quality can be provided.

The present disclosure is not limited to the foregoing embodiments and various aspects or elements can be modified and still be within the scope of the present disclosure.

Figure 9:
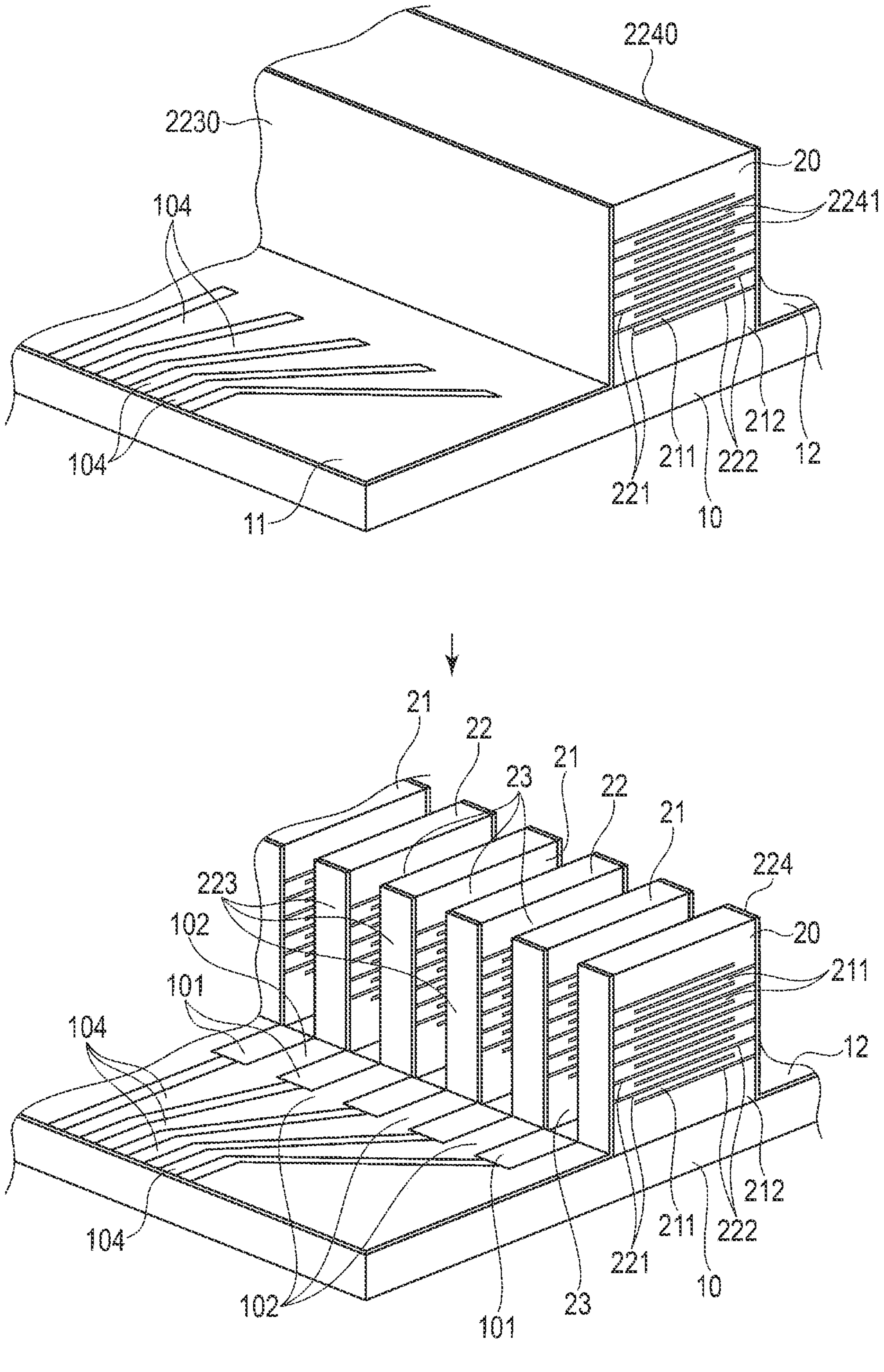
FIG. 9 is a diagram illustrating aspects of a method for manufacturing an inkjet head according to an embodiment.
Figure 10:
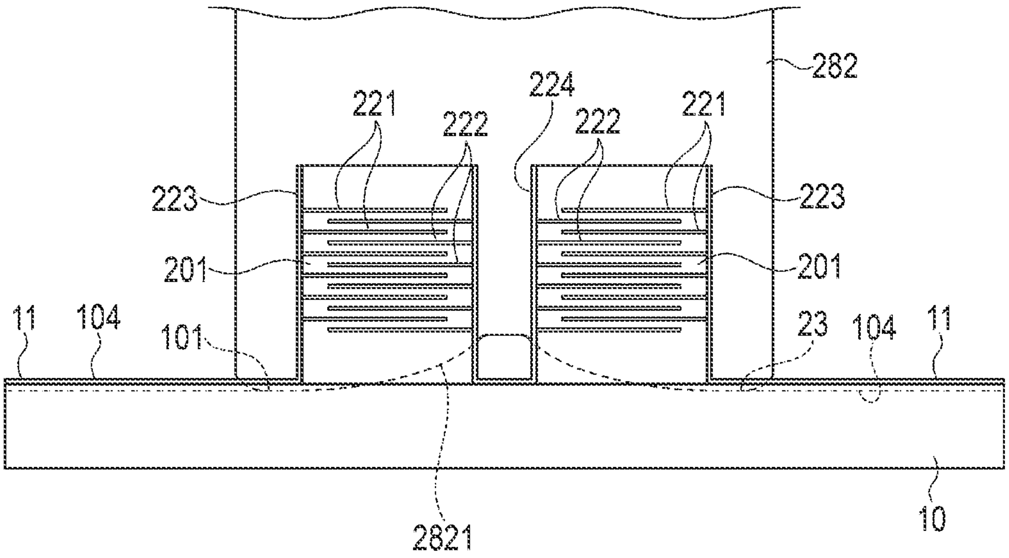
FIG. 10 is a diagram illustrating aspects of a method for manufacturing an inkjet head according to an embodiment.

In an embodiment, the entire length of the grooves 101 on the substrate 10 are formed simultaneously with the grooves 23, but the present disclosure is not limited thereto. For example, in another embodiment, as illustrated in FIGS. 9 and 10, a pattern wiring 104 can be formed by a patterning method by other means such as Photo Engraving Process (PEP) or a laser as a preprocessing step performed in an external region separated from the actuator unit 20 in the extension direction. Then, as postprocessing, by forming the grooves 101 together with the grooves 23 using the tool 282 with the curved cutting portion 2821, individual wirings 102 that are continuous with the outer pattern wiring 104 can be formed in regions near the actuator units 20 on the substrate 10, and thus a desired wiring pattern is formed. For example, this method is effective in a case where the pitch of the grooves of the actuator units 20 is different from the pitch of the wirings on the mounting surface, a case where long and collective mounting is difficult, or the like.

PEP is a process of sequentially performing film formation, resist coating, exposure, development, etching, and peeling (removing) remaining resist. The metal film can be formed on a substrate using a known method such as plating or sputtering. Then, a resist is applied onto the metal film. Next, the resist is exposed to light through a mask so that the resist remains in a portion to be left as the pattern corresponding to the electrodes. The unnecessary resist portion is dissolved by a developer. Exposed portions of the metal film are removed by etching. When the remaining resist is removed by a peeling solution, an electrode pattern is left formed on the substrate.

The specific materials or configurations of the piezoelectric elements 21 and 22 are not limited to the foregoing materials or configurations, but may be appropriately changed.

In an embodiment, the plurality of piezoelectric layers 211 are stacked and the driving piezoelectric elements 21 are driven through the vertical vibration (d33) in the stacking direction, but the present disclosure is not limited thereto. For example, the present disclosure can also be applied to a form in which the driving piezoelectric elements 21 are configured as a single-layered piezoelectric member or a form in which the driving piezoelectric elements 21 are driven through lateral vibration displaced in a d31 direction.

The arrangement of the nozzles 51 or the pressure chambers 31 is not limited to the foregoing embodiments. For example, the nozzles 51 may be arranged in two or more rows. An air chamber serving as a dummy chamber may be formed between the plurality of pressure chambers 31. The inkjet head 1 may be a non-circulation type inkjet head or a circulation type inkjet head or may also be applied to a side-shooter type inkjet head without being limited to an end-shooter inkjet head.

The example in which the piezoelectric elements 21 and 22 include the dummy layers 212 at both ends in the stacking direction is described but the present disclosure is not limited thereto. The dummy layer 212 may be included on only one side of the piezoelectric elements 21 and 22, or the piezoelectric elements 21 and 22 need not include a dummy layer 212 at all. In addition, the configuration and/or the positional relationship of various components including the flow passage member 40, the nozzle plate 50, and the frame unit 60 is not limited to the above-described example, but can be appropriately changed.

In an embodiment, two actuator units 20 are disposed in parallel on the substrate 10, but the present disclosure is not limited thereto. A single actuator unit 20 may be used in other examples.

The liquid to be ejected is not limited to printing ink. For example, an apparatus or the like for ejecting a liquid containing conductive particles for forming a wiring pattern of a printed wiring substrate may be adopted.

In an embodiment, the inkjet head 1 is used for a liquid ejecting apparatus such as an inkjet recording apparatus 100 is described, but the present disclosure is not limited thereto. For example, the inkjet head 1 can also be used in a 3D printer, an industrial manufacturing machine, a medical purpose device, or the like and a miniaturized, lightweight, and low-cost inkjet head 1 can be realized.

According to at least one of the above-described embodiments, it is possible to provide a liquid ejecting head with improved mountability and a liquid ejecting apparatus incorporating such a device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a piezoelectric member formed of a piezoelectric material, the piezoelectric member having a plurality of grooves extending lengthwise in a first direction, the grooves separating portions of the piezoelectric member into a plurality of piezoelectric elements spaced from each other in a second direction, a connection portion of the piezoelectric member being under at least a portion of the grooves in a third direction, the connection portion connecting the plurality of piezoelectric elements to each other;

a substrate joined to the connection portion of the piezoelectric member;

individual electrodes on a first surface of the piezoelectric member on a first side; and a common electrode on a second surface of the piezoelectric member on a second side, wherein each groove has a depth in an end portion of the groove on the first side that is deeper than a depth in an end portion of the groove on the second side, and the depth of each groove in the end portion on the first side reaches through the piezoelectric member to the substrate.

2. The liquid ejection head according to claim 1, wherein the individual electrodes are separated from each other by the grooves.

3. The liquid ejection head according to claim 2, wherein portions of the common electrode on a side surface of the plurality of piezoelectric elements are connected to each other by an electrode portion on the connection portion.

4. The liquid ejection head according to claim 2, further comprising:

individual wirings connected to the individual electrodes, the individual wiring being on a mounting surface of the piezoelectric member to which the substrate is mounted.

5. The liquid ejection head according to claim 1, further comprising:

a vibration plate on an upper surface of the piezoelectric member;

a plurality of pressure chambers adjacent to the vibration plate in the third direction; and a plurality of nozzles connected to the plurality of pressure chambers.

6. The liquid ejection head according to claim 1, wherein the piezoelectric member comprises a plurality of piezoelectric layers stacked with internal electrode layers.

7. The liquid ejection head according to claim 1, wherein the piezoelectric material is lead zirconate titanate.

8. A liquid ejecting apparatus, comprising:

a liquid ejection head configured to eject a liquid, the liquid ejection head including:

a piezoelectric member formed of a piezoelectric material, the piezoelectric member having a plurality of grooves extending lengthwise in a first direction, the grooves separating portions of the piezoelectric member into a plurality of piezoelectric elements spaced from each other in a second direction, a connection portion of the piezoelectric member being under at least a portion of the grooves in a third direction, the connection portion connecting the plurality of piezoelectric elements to each other;

a substrate joined to the connection portion of the piezoelectric member;

individual electrodes on a first surface of the piezoelectric member on a first side; and a common electrode on a second surface of the piezoelectric member on a second side, wherein each groove has a depth in an end portion of the groove on the first side that is deeper than a depth in an end portion of the groove on the second side, and the depth of each groove in the end portion on the first side reaches through the piezoelectric member to the substrate.

9. The liquid ejecting apparatus according to claim 8, wherein the individual electrodes are separated from each other by the grooves.

10. The liquid ejecting apparatus according to claim 9, wherein portions of the common electrode on a side surface of the plurality of piezoelectric elements are connected to each other by an electrode portion on the connection portion.

11. The liquid ejecting apparatus according to claim 8, further comprising:

a sheet conveyor configured to convey a sheet past the liquid ejection head, wherein the liquid ejection head is positioned to eject the liquid towards the sheet on the sheet conveyor.

12. The liquid ejecting apparatus according to claim 8, wherein the liquid is an ink.

* * * * *